(No Model.)
J. H. ALLEN.
CULTIVATOR.
No. 288,292. Patented Nov. 13, 1883.
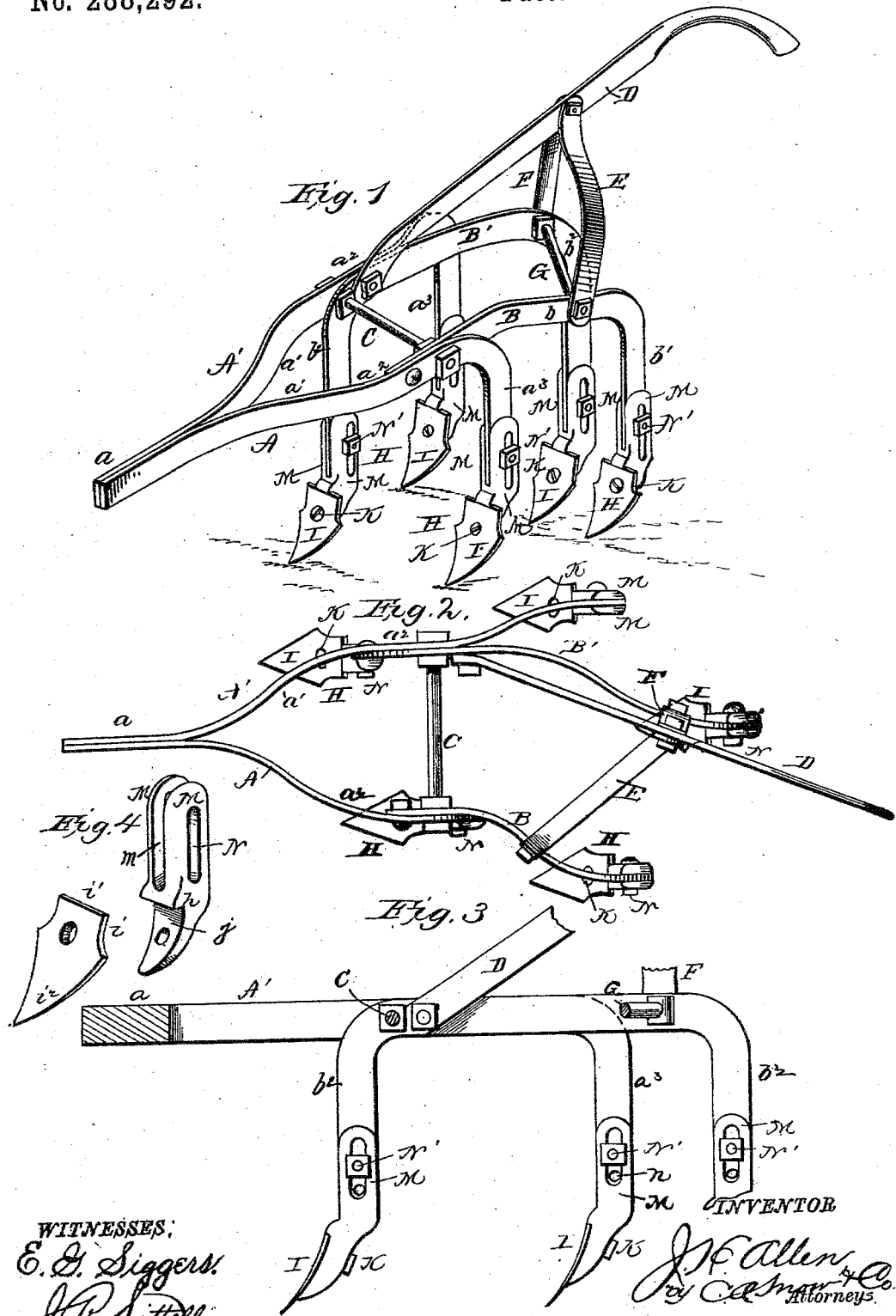

UNITED STATES PATENT OFFICE.

JAMES H. ALLEN, OF WENONA, ILLINOIS.

CULTIVATOR.

SPECIFICATION forming part of Letters Patent No. 288,292, dated November 13, 1883.

Application filed May 11, 1883. (No model.)

*To all whom it may concern:*

Be it known that I, JAMES H. ALLEN, a citizen of the United States, residing at Wenona, in the county of Marshall and State of Illinois, have invented a new and useful Cultivator, of which the following is a specification, reference being had to the accompanying drawings.

This invention relates to cultivators, and especially to that class of the same known as "wheel-cultivators;" and it has for its object to thoroughly pulverize the ground and kill the weeds without injury to the corn or other grain. To attain these objects and other important advantages, I provide certain novel improvements in the construction and arrangement of parts, as hereinafter fully set forth, and specified in the claims.

In the accompanying drawings, Figure 1 represents a perspective view of one gang of my improved straddle-row cultivator. Fig. 2 represents a plan view of the same. Fig. 3 represents a vertical cross-section of Fig. 2. Fig. 4 represents a detail view of one of the plow-feet, showing the attachment to the standards of the cultivator.

Like letters refer to corresponding parts in all the figures.

Referring to the drawings, it will be seen that only one half or one gang of the cultivator is shown, the remaining half being constructed in the same manner. Each half or gang is attached to the running-gear of any two-wheeled cultivator, so that each one is placed on opposite sides of a row of corn or other grain. I will therefore describe the construction of one-half of the cultivator, the other half being identically the same.

A A' designate the front plow-beams, which run parallel together at their front ends, $a$, where they may be welded or otherwise secured together. From the portion $a$ the beam A diverges outwardly a short distance, as at $a'$, then runs horizontally, as shown at $a^2$, and finally curves downward, terminating in a vertical shank, $a^3$. The beam A' is of similar construction, with the exception that it diverges outward from the portion $a^2$, and then curves downward to the vertical shank $a^3$. Thus the said beam A' is made longer than the other beam, and by this means the attached shovel-plows will not be opposite each other.

B B' designate two parallel plow-beams, secured to the inner sides of the two beams A A'. The front end of beam B is attached by screw-bolts and nuts to the beam A, and then diverges outward, as shown at $b$, and finally curves downward to the vertical shank $b'$. The construction of beam B' is almost identical with the above, except that the front end of said beam B' is provided with a curved vertical shank, $b^2$, and the beam is longer and extends back farther than all the other beams.

C designates a brace bar or rod, which is passed transversely across, connecting the beams A A' B B' together, and provided with nuts for securing the same. A handle, D, is secured to the inner side of beam B', and is provided with curved brace E and upright brace F, connected to the handle, the said braces connecting also with a rod, G, which passes transversely across, joining the beams B B' together. The said rods C G not only brace the beams against outward strains, but they also hold them against lateral displacement.

H designates the adjustable plow-feet, adapted to be attached to each of the shanks $a^3 b' b^2$. The lower end of each plow-foot extends obliquely downward, and to the front of the same are secured the shovel-plows I. The plows I are formed of parallel straight sides $i$, horizontal top edge, $i'$, and cutting-edges $i^2$, which taper to a point, as shown. Said shovel-plows are fitted in the face of each plow-foot, the top edge, $i'$, abutting against the shoulders $h$, formed in the plow-foot. Bolts $k$ pass through the parts and secure the same together, the heads of said bolts being countersunk in the plows. The shoulders $h$ assist in preventing lateral as well as upward displacement, and thus relieve the bolts $k$ from considerable strain. Each plow-foot is provided with vertical arms M M, leaving a vertical space, $m'$, between the same for the reception of the shanks $a^3 b' b^2$, and a vertical slot, N, is formed in each of the arms, and through said slot a screw-bolt, N', passes, and is inserted through any one of the openings $n$ formed in the said shanks, a nut being used to tighten the plow-foot onto the shank. By raising or lowering each plow-foot to the point desired, and then tightening the bolts, the plows can be adjusted for various kinds of work.

It will be seen that no two plows run opposite each other, and thus rubbish and weeds will not clog the machine, but will be allowed a ready means of escape between the plows.

As heretofore stated, each half or gang of the straddle-row cultivator shown in Fig. 1 is attached to the running-gear of any two-wheeled cultivator in any suitable manner, and by a few slight changes in arrangement the cultivator shown in Fig. 1 could readily be adapted to serve as a "walking-cultivator."

By means of the adjustability of the plows my cultivator can be adapted to all kinds of work.

My improved cultivator is simple and durable in its construction and efficient in its operation, besides possessing other superior advantages, which will appear obvious to all.

I am aware that it is not new in cultivators to construct the plow-feet with vertical arms. I am also aware that plow-feet have been provided with a clamping-lever which fits over the plows, and thus secures the same; but I am not aware that the said vertical arms have been provided with vertical slots in which a screw-bolt works, so as to secure the plow-feet to any one of a series of openings in the shanks.

I claim and desire to secure by Letters Patent—

1. In a cultivator, the combination of the curved beams A A', of unequal length, with the beams B B', secured to the beams A A', the beam B' having a shank at both front and rear ends, the parts being so arranged that no two plows carried by the shanks of said beams will come opposite each other, and connected by transverse rods C G, all arranged and operating substantially as shown and described.

2. In a cultivator, the bifurcated adjustable plow-foot H, formed with a vertical slot, N, in each of its arms M, in combination with the shanks formed with the lateral slots n, and the screw-bolt N', substantially as set forth.

In testimony that I claim the foregoing as my own I have hereto affixed my signature in presence of two witnesses.

JAMES H. ALLEN.

Witnesses:
G. W. MARLEY,
J. W. MOORE.